United States Patent [19]
Herke et al.

[11] Patent Number: 5,171,002
[45] Date of Patent: Dec. 15, 1992

[54] MACHINE TOOL APPARATUS

[75] Inventors: Donald P. Herke, Roseville; Jerrol J. Van Houten, Lakeland; Timothy J. Gamboni, Stillwater, all of Minn.

[73] Assignee: Laser Machining, Inc., Somerset, Wis.

[21] Appl. No.: 817,284

[22] Filed: Jan. 6, 1992

[51] Int. Cl.⁵ .............................................. B23Q 1/02
[52] U.S. Cl. ...................................................... 269/73
[58] Field of Search ................. 269/73, 71, 55, 35, 269/289 R; 384/15

[56] References Cited

U.S. PATENT DOCUMENTS

| | | | |
|---|---|---|---|
| 3,515,444 | 6/1970 | Grabner | 384/15 |
| 3,751,120 | 8/1973 | Kietz | 384/15 |
| 3,785,418 | 1/1974 | Hennig et al. | 384/15 |
| 4,129,291 | 12/1978 | Kato et al. | 269/73 |
| 4,750,721 | 6/1988 | Sasada | 269/73 |
| 4,834,353 | 5/1989 | Chitayat | 269/73 |
| 4,867,578 | 9/1989 | Komiya | 384/15 |

Primary Examiner—Robert C. Watson
Attorney, Agent, or Firm—Kinney & Lange

[57] ABSTRACT

An apparatus for use on a machine tool having a table movable along a rail disposed in a way. The apparatus includes a way cover and a rail engaging coupling. The way cover includes a top and first and second opposing way side walls extending generally downwardly. The rail engaging coupling includes bearing means and a housing portion housing the bearing means. First and second legs extend from opposite sides of the housing portion and are attached to the table top of the table at distal ends. The legs extend from the housing portion under the way cover side walls to movably connect the table top with the rail.

17 Claims, 7 Drawing Sheets

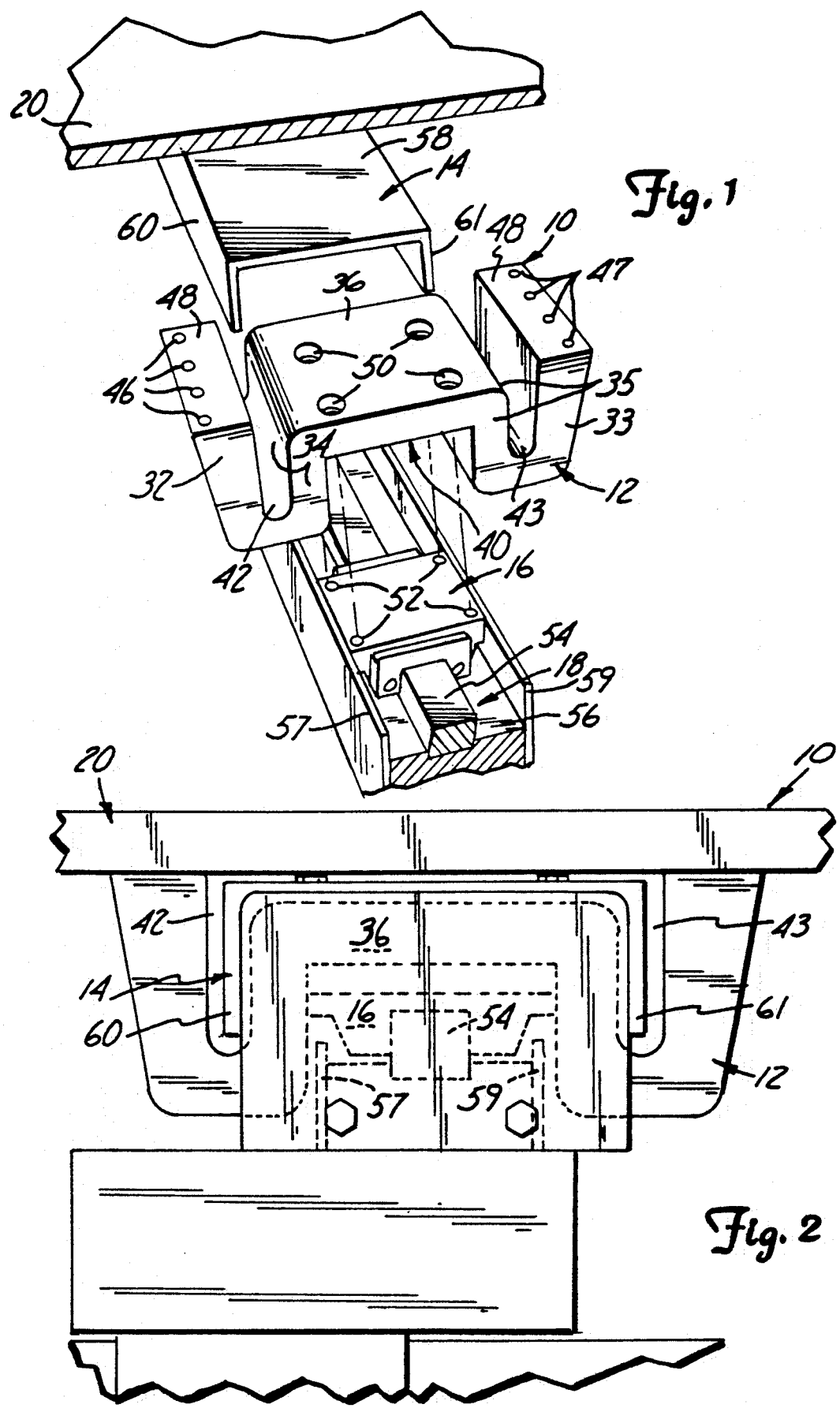

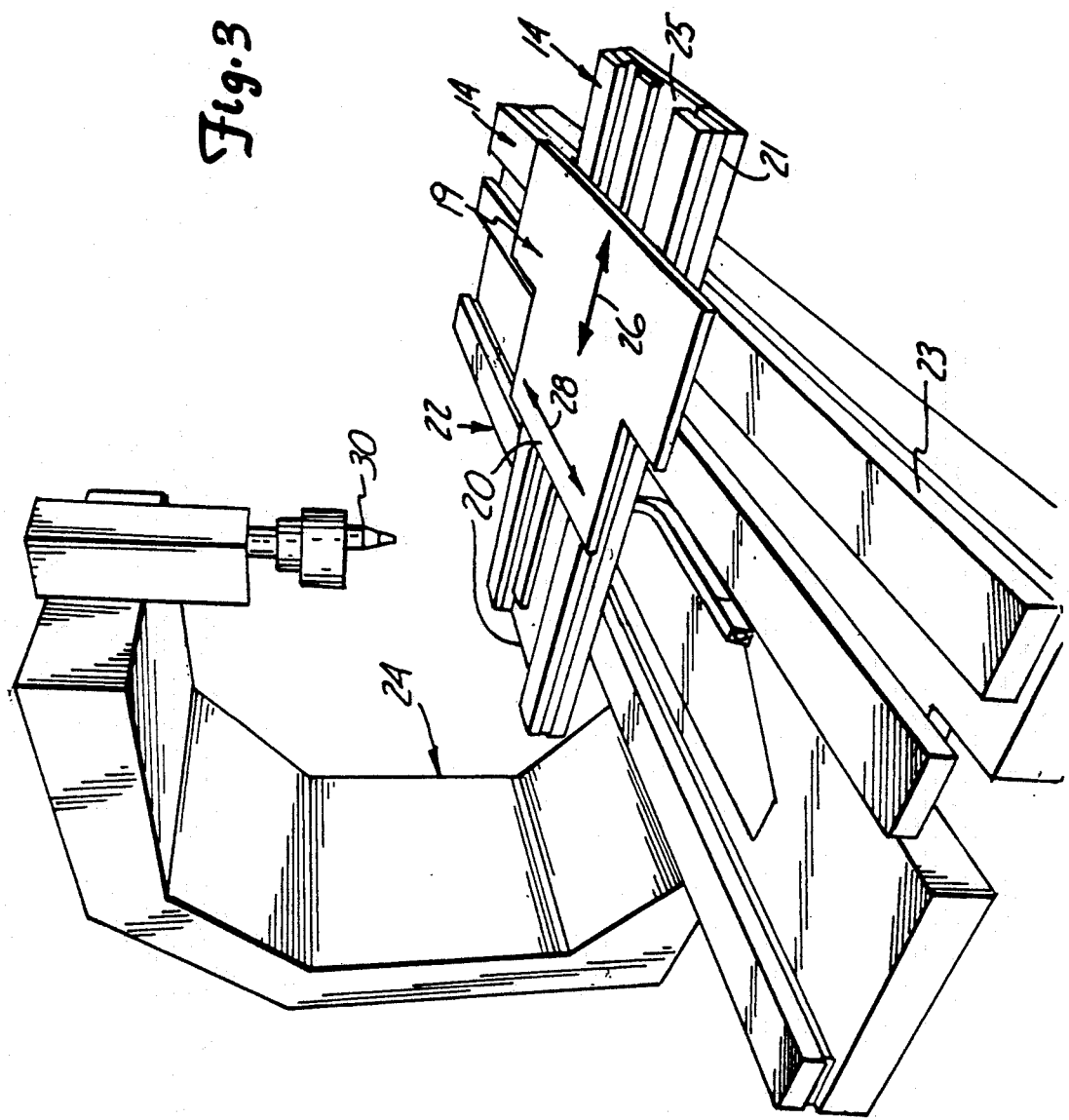

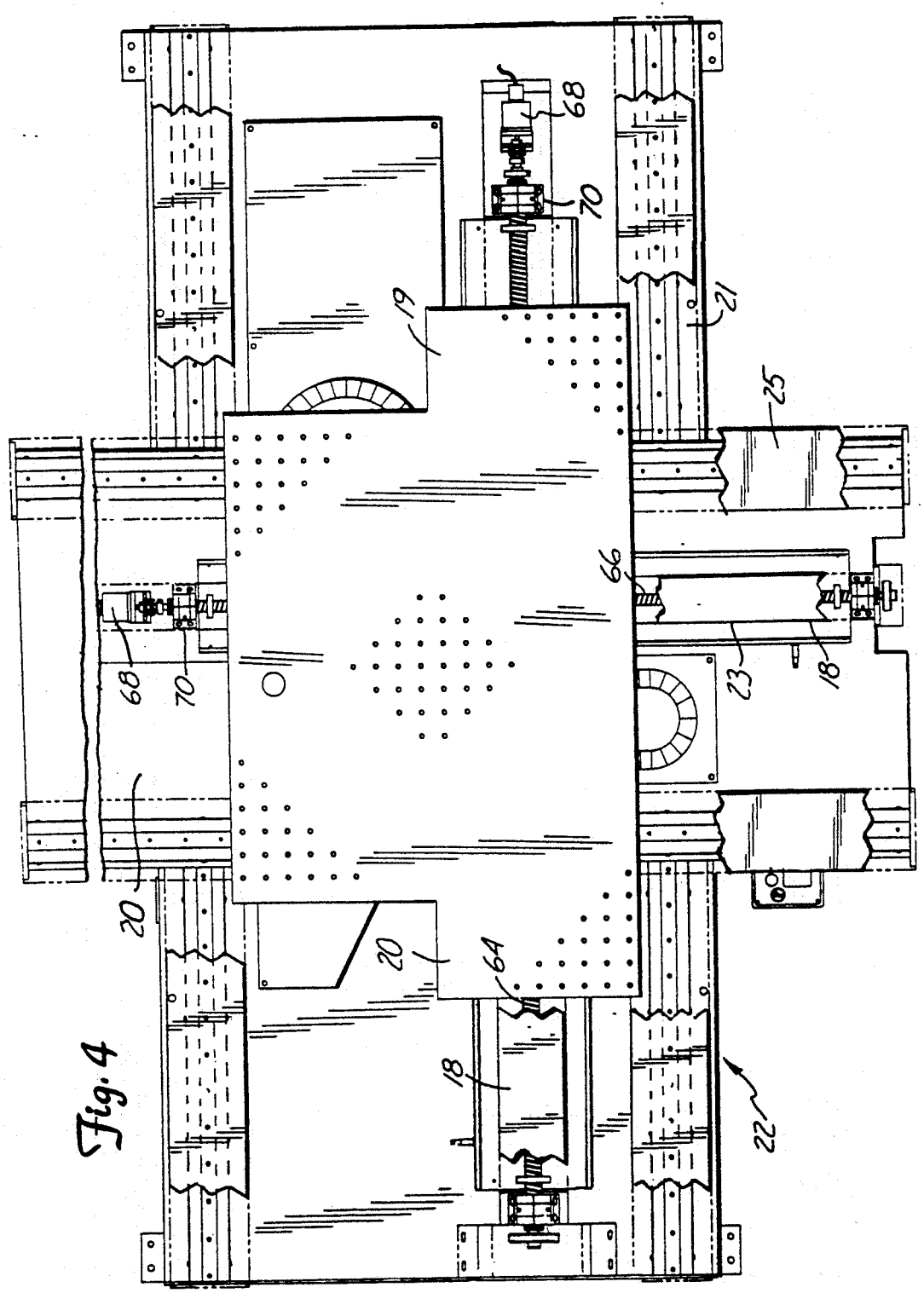

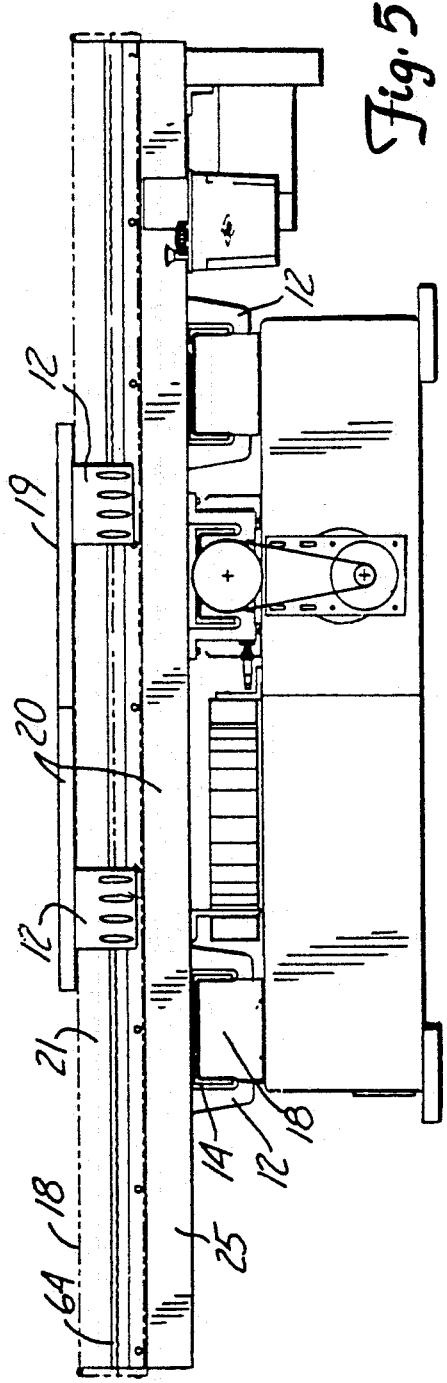
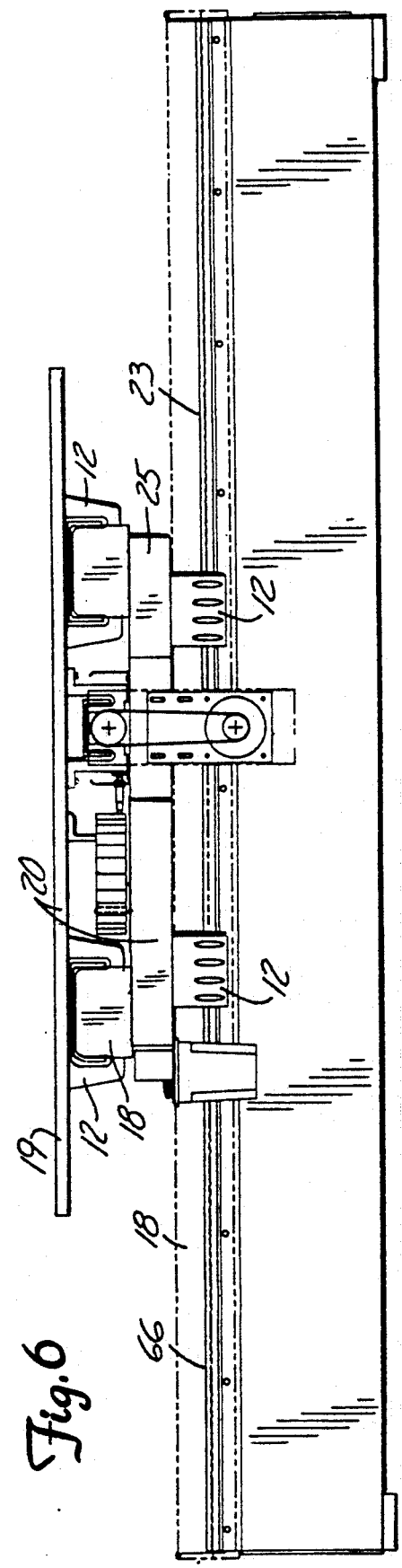

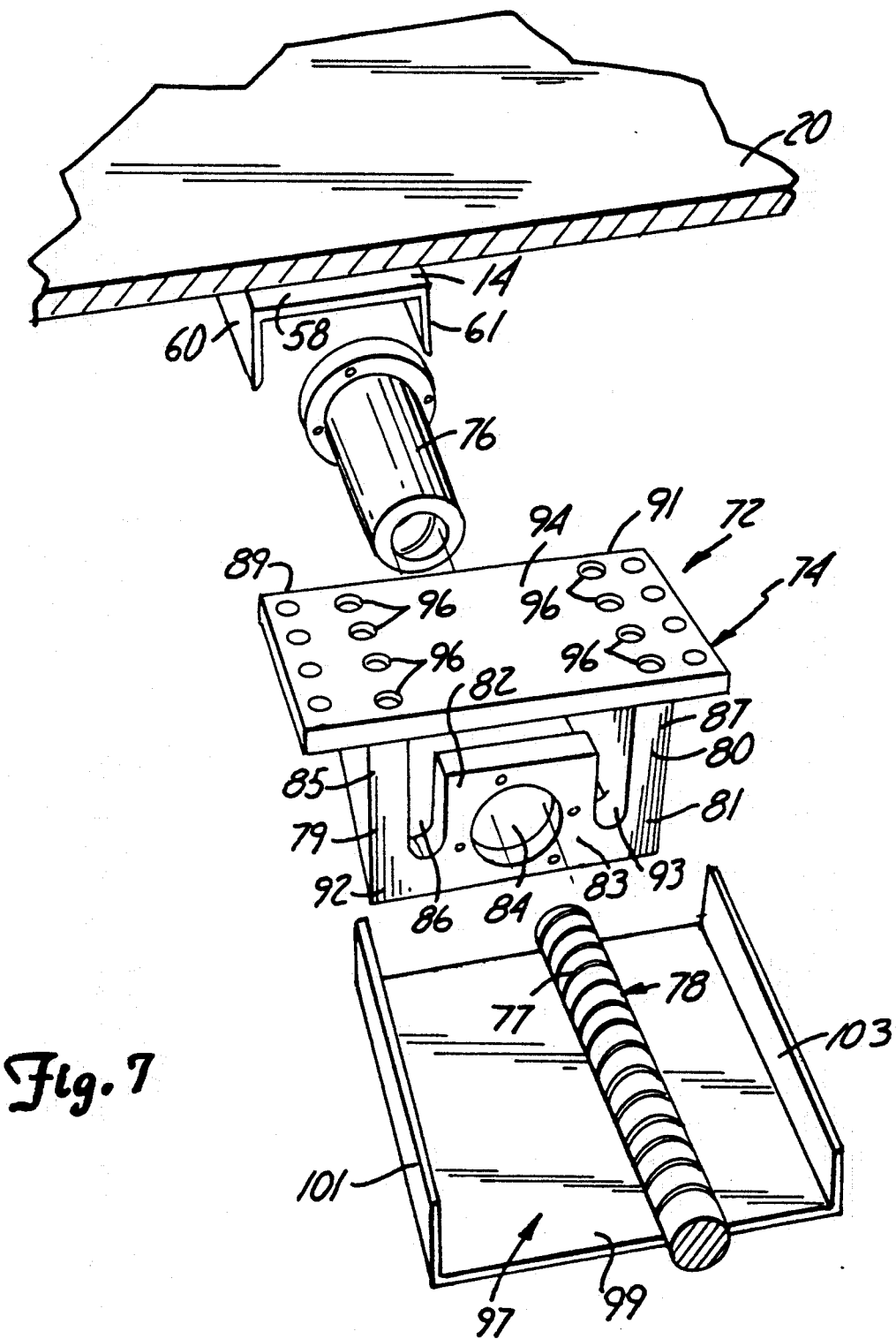

MACHINE TOOL APPARATUS

BACKGROUND OF THE INVENTION

The present invention relates to an apparatus for protecting bearings and shafts, and in particular, the present invention relates to an apparatus for protecting bearings and shafts in ways of x-y movable tables.

Many components are shaped by utilizing machine tools. Machine tools have a variety of cutting mechanisms that include bits, blades and lasers for shaping components.

Typically, a work piece to be machined is carried on a table top of the machine tool. The table top moves in two directions. The mechanism for moving the table top includes shafts and bearings that are disposed in ways below the table top. When machining the work piece, the machine tool throws chips, particles, condensate, fluid, or abrasive materials that land upon the shafts and bearings within the way.

Way covers protect the shaft and bearings within the way from chips and particles by shielding the shafts and bearings. One type of way cover includes a flexible sheet mounted on a take-up spool. The flexible sheet includes a plurality of shorter flexible sheets and a plurality of ribs to which the flexible sheets are attached. The take-up spool is rolled or un-rolled in order to adjust the length of the flexible sheet. The flexible sheet is unrolled from the spool to a length necessary for protection.

One other type of way cover includes a telescoping way cover. The telescoping way cover telescopes as the table moves and covers the exposed portions of the shaft.

A shade cover has been employed on machines, such as drilling and milling machines, which generate only small chip loads. The shade cover is similar to the flexible sheet way cover in that the shade cover includes a flexible sheet which is wound around a spool. However, the shade cover is not as strong as a flexible sheet cover because the shade cover does not include reinforcing ribs. Also, the shade cover is typically smaller than the flexible sheet cover.

SUMMARY OF THE INVENTION

The present invention includes an apparatus for use in a machine tool having a table with a table top movable along rails located in ways. The apparatus of the present invention includes a way cover and a rail-engaging coupling.

The way cover includes a top, left, and right opposing side walls integral with the top.

The rail-engaging coupling includes a bearing mechanism for engaging and traveling along the rail. The coupling further includes a housing portion that houses the bearing mechanism and travels beneath the way cover. Left and right leg portions extend from opposite sides of the housing portion along the outside of the side walls of the way cover, each leg forming a channel between the housing portion and a leg portion to accept a respective side wall. The upper portions of the legs are fixedly attached to the table top thereby movably attaching the table top to the rail.

BRIEF DESCRIPTION OF THE DRAWINGS

FIG. 1 is a perspective view of the apparatus of the present invention.

FIG. 2 is a cross-sectional view of one embodiment of the way cover of the present invention.

FIG. 3 is a perspective view of a machine tool that includes an x-y table and a plurality of ways along which the x-y table is moved.

FIG. 4 is a top view of the x-y table of a machine tool and of the ways along which the x-y table is moved.

FIG. 5 is a side view of the x-y table and four rails upon which the x-y table is moved.

FIG. 6 is an opposing side view of the x-y table and four rails upon which the x-y table is moved.

FIG. 7 is a perspective view of an alternative embodiment of the way cover of the present invention.

DETAILED DESCRIPTION OF THE PREFERRED EMBODIMENTS

Figure 8:
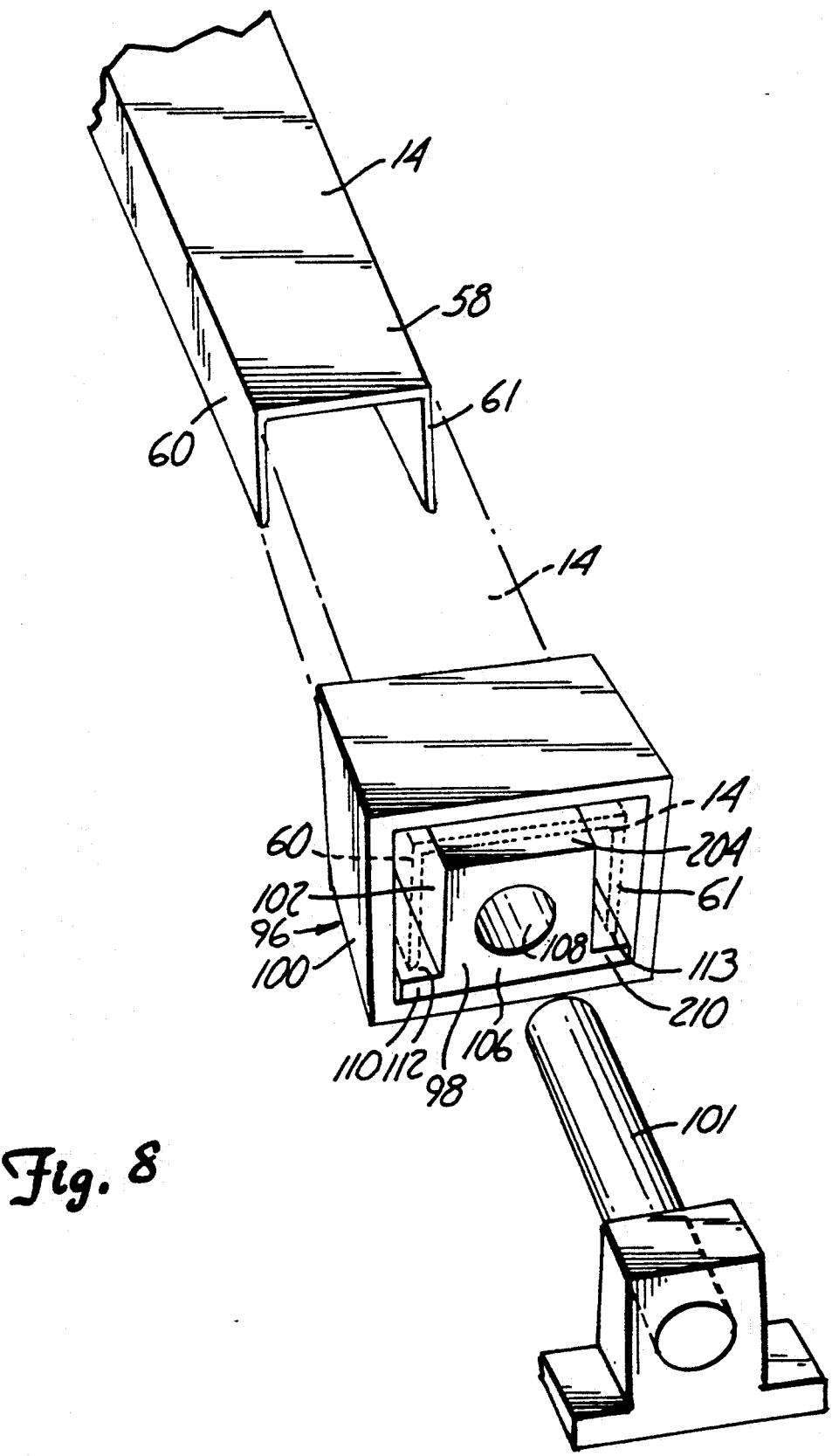
FIG. 8 is a perspective view of another alternative embodiment of the way cover of the present invention.

The apparatus of the present invention, illustrated generally at 10 in FIG. 1, includes a W-shaped yoke 12 and a way cover 14 that overlays the W-shaped yoke 12. The W-shaped yoke 12 attaches to a guide bearing 16 included within a way 18. The W-shaped yoke 12 also attaches to a table top 20 movable in either an x-direction, a y-direction or an x-y direction. Although a table top that is movable in specific directions is described, the present invention is suitable for use in any mechanism that moves the table top in a linear direction. The W-shaped yoke 12 is movable with guide bearing 16 while the way cover 14 remains stationary and unchanged in form.

The W-shaped yoke 12 and way cover 14 of the apparatus 10 of the present invention are included in an x-y table 22 of a machine tool 24 as illustrated in FIG. 3. In addition to the W-shaped yoke (not shown in FIG. 3) and the way cover 14, the x-y table 22 includes a table top 20 having an x-y table top portion 19 movable in both an x and a y direction as indicated by arrows 26 and 28 respectively in FIG. 3. The table top 20 of the x-y table 22 also includes a lower y-directed table portion 25 located below the upper x-y table top portion 19. The y-directed table portion 25 moves in the y-direction. The y-direction of the x-y table top portion 19 and y-directed table portion 25 are perpendicular to the x-direction 26 in the manner of a pair of Cartesion coordinates.

The y-directed table portion 25 includes ways 21 oriented in the x-direction. The x-y table top portion 19 is movable over the x-directed ways 21 of the y-directed table portion 25. The y-directed table portion 25 is movable over ways 23 oriented in the y-direction. Thus, movement of the y-directed table portion 25 in the y-direction also moves the x-y table top portion 19 in the y-direction. However, movement in the x-direction is possible only for the x-y table top portion 19. The movement of the x-y table 22 permits the machine tool 24, having a cutting mechanism 30, to remain stationary while a work piece to be cut or scored by the cutting mechanism 30 is moved as the x-y table top portion 19 moves.

The W-shaped yoke 12 of the apparatus 10 of the present invention includes first and second opposing outside legs 32 and 33, each leg conjoined respectively to a housing 40 to form a first and second channel 42 and 43 as illustrated in FIG. 1. The housing 40 includes opposing side sections 34 and 35 and a flat top section 36. Each of the opposing side sections 34 and 35 of the housing 40 is conjoined to and integral with the flat top section 36.

The W-shaped yoke 12, illustrated in FIG. 1, is referred to as "W-shaped" because the cross-section of the yoke 12 has a configuration similar to the letter W. The W-shaped yoke 12 of the present invention is attached to the guide bearing 16 at the housing 40 and is attached to the table top 2 at the outside legs 32 and 33 of the W-shaped yoke 12 so that the table top 20 is movable in either an x-direction, a y-direction or an x-y direction.

The opposing outside legs 32 and 33 of the W-shaped yoke 12 are of a height sufficient to attach to the table top 20 of the machine tool 24. Each leg, 32 and 33, includes a plurality of holes 46 and 47 respectively, for attaching the W-shaped yoke 12 to the table top 20 of the machine tool 24. The plurality of holes 46 are disposed in an upper end 48 of the leg 32. The plurality of holes 47 are disposed in an upper end 49 of the leg 33. The table top 20 is then attached to the upper ends 48 and 49 respectively of the legs 32 and 33 when bolts (not shown) are inserted into the plurality of holes 46 and 47.

The housing 40 of the W-shaped yoke 12 attaches to the guide bearing 16 by four bolts (not shown). The four bolts are passed through four bolt holes 50 within the flat top section 36 of the housing 40 of the W-shaped yoke 12. The four bolts are also passed through four bolt holes 52 within the guide bearing 16 that are in alignment with the four bolt holes 50 of the flat top section 36 of the housing 40. Once the top section 36 of the housing 40 of the W-shaped yoke 12 is attached to the guide bearing 16 so that the guide bearing 16 is contained within the housing 40, the W-shaped yoke 12 moves with the guide bearing 16.

The guide bearing 16 is movably engaged with a rail 54, as illustrated in FIG. 1. As used herein, the term rail shall mean any shaft or track located within the way 18. Other mechanisms such as a linear slide, a ball screw, a rack and pinion arrangement, or a linear motor are also includable within the term rail and the present invention. The guide bearing 16 and track 54 are disposed within the way 18. The way 18 of FIG. 1 is located on a mount 56. Left and right shield track shields 57 and 59 are attached to the mount 56. The shields 57 and 59 extend above the mount 56 and extend along the length of the track 54 and the mount 56.

The track 54, way 18 and guide bearing 16 are each covered by the way cover 14. The way cover 14 of the present invention includes an elongated top section 58 supported by a first and a second opposing way cover side wall 60 and 61. The way cover 14 is disposed over the flat top section 36 of the housing 40 of the W-shaped yoke 12 so that the flat top section 36 is overlaid by the elongated top section 58 of the way cover 14. The way cover 14 is also disposed so that the first opposing way cover side wall 60 is disposed within the first channel 42 of the W-shaped yoke 12 as illustrated in FIG. 2. The second opposing way cover side wall 61 of the way cover 14 is disposed within the second channel 43. The shields 57 and 59, the W-shaped yoke 12 and the sidewalls 60 and 61 form an interlocking protective mechanism for protecting the track 54.

The two opposing side sections 34 and 35 of the housing 40 are of a height great enough to permit the side walls 60 and 61 of the way cover 14 to be suspended in the first and second channels 42 and 43. The opposing side section 34 and opposing leg 32 conjoin under the way cover side wall 60. The opposing side section 35 and opposing leg 33 conjoin under the way cover side wall 61.

The W-shaped yoke 12 and way cover 14 together permit movement of the table top 20 of the x-y table 22 without any extension of the way cover 14. Thus, the W-shaped yoke 12 and way cover 14 of the apparatus 10 of the present invention protect the guide bearing 16 and track 54 without utilizing more space than is utilized by the x-y table 22 and machine tool 24 alone.

Two ways 21 and 23, disposed in the x and y directions respectively of the x-y table 22 are illustrated in FIG. 4. Two shafts, 64 and 66, of a screw type, are each disposed within one of two ways 21 and 23. Each guide bearing (not shown) used to move the table top 20 is disposed so that one guide bearing is movably engaged over one shaft 64 or 66. The guide bearing is movably engaged when a motor 68 is actuated. The motor 68 is connected to a drive 70 to which the shaft 64 or 66 is also connected. For a screw-type guide bearing 16, as the screw-type shaft 64 or 66 is rotated, the guide bearing 16 is moved down the shaft 64 or 66.

Each W-shaped yoke 12 of the apparatus 10 of the present invention is located beneath either the upper x-y table top portion 19 or the lower y-directed table top portion 25 of the table top 20 as illustrated in FIG. 5. The W-shaped yokes 12, illustrated in FIG. 5, are each located along either x or y directed shafts 64 and 66 so that one W-shaped yoke 12 is attached to one guide bearing (not shown). The y-directed shafts 66 are located in lower y-ways 23 and the x-directed shafts 64 are located in upper x-ways 21 positioned above the lower y-ways 23, as illustrated in FIGS. 5 and 6. Way covers 18 cover both lower y-ways 23 and upper x-ways 21. The W-shaped yokes 12 attached to bearings movably engaged to the upper x-directed shafts 64 are also attached to the x-y table top portion 19. The W-shaped yokes 12 attached to bearings 16 movably engaged to lower y-directed shafts 66 are attached to the lower y-directed table top portion 25.

One modified embodiment of the W-shaped yoke 72 and way cover 14 apparatus of the present invention is illustrated at 74 in FIG. 7. The modified W-shaped yoke 72 is interposed with the way cover 14 in a manner similar to that of the W-shaped yoke. The modified W-shaped yoke 72 contains a ball bearing 76 movably engaged with a groove 77 on a screw shaft 78 within the way (not shown). The modified W-shaped yoke 72 also attaches to the table top 20.

The modified W-shaped yoke 72 includes an outside leg 79 having a front end 85 and a rear end 89. The modified W-shaped yoke 72 also includes an opposing outside leg 80 having a front end 87 and a rear end 91. The outside leg 79 and opposing outside leg 80 are each conjoined respectively to a front housing 81 and a rear housing not shown in FIG. 7. The front housing 81 and the rear housing (not shown) are similar in construction. The rear housing that is not shown conjoins the opposing outside legs 79 and 80 at rear ends 89 and 91 respectively. The front housing 81 conjoins the opposing outside legs 79 and 80 to form channels 86 and 93, similarly to the W-shaped yoke 12. The front housing 81 includes a main body 82 having a circular orifice 84 disposed approximately centrally through the main body 82. The rear housing (not shown) also includes a main body (not shown) and orifice (not shown) in alignment with the main body 82 and orifice 84 of the front housing 81.

The modified W-shaped yoke 72 further includes a top plate 94 attached to the opposing outside legs 79 and 80. The top plate 94 includes a plurality of holes 96 for attaching the modified W-shaped yoke 72 to the x-y table top 20. The top plate 94 is perpendicular to the opposing outside legs 79 and 80.

A longitudinal pan 97 extends under the length of the shaft 78. The pan 97 includes a floor 99 and left and right upwardly extending sidewalls 101 and 103. The modified yoke 72 is positioned within the pan and travels along the pan's length. The pan 97, the way cover 14, and the modified yoke 72 form an interlocking mechanism that protects the shaft 78.

The sleeve bearing 76 attached to the modified W-shaped yoke 72 is passed through the orifice 84 of the housing 81 and the orifice of the housing not shown. The sleeve bearing 76 movably engages the shaft 78. The shaft 78 is covered by the way cover 14. The first and second opposing way cover side walls 60 and 61 of the way cover 14 each fit within the channels 86 and 93 so that the sleeve bearing 76 moves while the way cover 14 remains stationary. Like the W-shaped yoke 12 and way cover 14, the apparatus that includes the way cover 14 and modified W-shaped yoke 72 covers the ways, bearings and shafts and protects the bearings and shafts from particles and condensibles. The apparatus that includes the way cover 14 and modified W-shaped yoke 72 also permits movement of the table top 20 along the shaft 78 using the sleeve bearing 76.

Another embodiment of the apparatus of the present invention is illustrated at 96 in FIG. 8. The embodiment 96 includes a housing 98 and an exterior box cover 100 that contains the housing 98. The housing 98 is similar to the modified W-shaped yoke 72 in that the housing 98 includes a main body 102 having a circular orifice 108 disposed approximately centrally within the main body 102. The main body 102 also includes a base 110 disposed at the bottom of the main body 102 integral with the main body 102.

The housing 98 and exterior box cover 100 interpose to form a first and second slot 112 and 113 between the exterior box cover 100 and housing 98. The way cover 14 overlays the housing 98 so that the first and the second opposing side walls 60 and 61 of the way cover 14 fit within the first and second slot 112 and 113 respectively between the housing 98 and the exterior box cover 100. The housing 98 and exterior box cover 100 are movable along a shaft 101 while the way cover 14 remains stationary. The shaft 101 is held in a raised position by a first support 103 and a second support (not shown), which support the shaft by engaging opposing ends.

Figure 9:
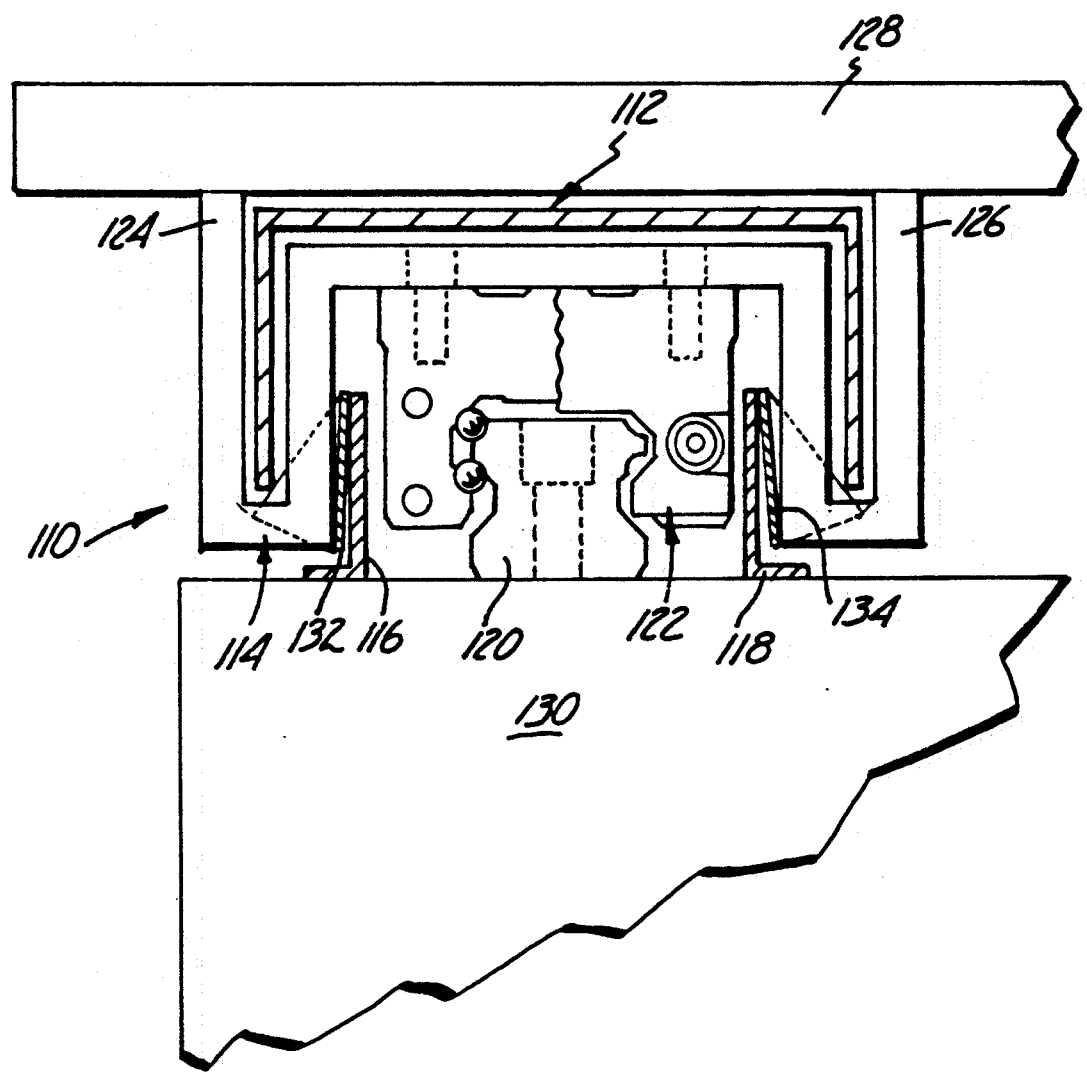
FIG. 9 is an elevational view of yet another alternative embodiment of the present invention.

Another embodiment of the present invention is generally illustrated at 110 in FIG. 9. The embodiment includes a way cover 112, a W-shaped yoke 114, and left and right longitudinal shields 116 and 118 disposed on opposing sides of a longitudinal rail 120. A bearing mechanism 122 engages the rail 120 and is secured to the W-shaped yoke such that the yoke is movable along the rail 120. The W-shaped yoke has left and right upwardly extending legs 124 and 126 which are secured to a table top 128 such that the table top 128 moves along with the yoke 114 along the rail 120.

The way cover 112 and the W-shaped yoke 114 are similar in construction to the yoke and way cover described with respect to FIGS. 1 and 2. The longitudinal shields 116 and 118, unlike the shields 57 and 59 of FIG. 1 are not secured to the mount 56, but are instead secured to a base 130. However, similar to the shields 57 and 59 of FIG. 1, the shields 116 and 118, the W-shaped yoke 114, and the way cover 112 form an interlocking mechanism that protects the shaft 120.

In addition, the embodiment 110 preferably includes left and right lip seals 132 and 134, which are each secured at upper ends to the upper ends of shields 116 and 118, respectively. The lip seals 132 and 134 are made of a flexible material such as rubber. The lip seals 132 and 134 form an air seal preventing contamination of the bearings and the rails by airborne particulate matter. As illustrated in FIG. 9, the lip seals 132 and 134 are biased upwardly and outwardly such that distal ends of the seals engage lower ends of the side walls of the way cover 112, as illustrated by broken lines. However, in the vicinity of the W-shaped yoke, the legs of the yoke engage the lip seal separating the lip seal from the side walls of the way cover 112 to form a seal between the W-shaped yoke and the shields 116 and 118 and permit the W-shaped yoke to travel along the rail 120. As the W-shaped yoke 114 travels along the rail 120, the yoke separates the flexible lip seals 132 and 134 from the side walls of the way cover 112 and the flexible lip seals 132 and 134 move back in sealing relationship with the side walls of the way cover 112 in the areas left by the W-shaped yoke 114.

Although the present invention has been described with reference to preferred embodiments, workers skilled in the art will recognize that changes may be made in form and detail without departing from the spirit and scope of the invention.

What is claimed is:

1. An apparatus for use in a machine tool having a table with a table top being movable along a rail disposed in a way, the apparatus comprising:
    a way cover, having a top wall and left and right opposing side walls, the way cover extending over substantially the entire length of the rail and below the table top;
    a rail engaging coupling comprising:
        bearing means movably engaging the rail;
        a housing portion housing the bearing means; and
        left and right legs extending from opposite sides of the housing portion and attached to the table top of the table at distal ends, the left leg extending from the housing under the left side wall of the way cover and the right leg extending from the housing under the right side wall of the way cover to movably connect the table top with the rail.

2. The apparatus of claim 1 wherein the legs and housing portion are configured to form a W-shaped yoke.

3. The apparatus of claim 1 wherein each leg is spaced from the housing and extends in a generally upward direction to define a left and right channel respectively between the housing and the leg, and the side walls extend into respective left and right channels.

4. The apparatus of claim 1 and further including left and right shield walls positioned proximate the rail and extending substantially alongside the length of the rail, and extending sufficiently upward to provide a barrier to particulate matter.

5. The apparatus of claim 2 and further including:
    left and right shield walls extending alongside opposing sides of the rail along substantially the length of the rail and extending upwardly above the rail;

wherein the left and right legs of the W-shaped yoke extend initially generally downwardly from the housing portion and then outwardly under the side walls of the way cover and generally upwardly to the table top; and wherein the shield walls are disposed on inward sides of the initial downward extension of the left and right legs and wherein the left and right way cover side walls are each disposed between respective left and right downward and upward leg extensions to form an interlocking particulate barrier with the shield walls.

6. The apparatus of claim 2 and further including left and right upwardly extending shield walls disposed on outer sides of the left and right legs, respectively, of the housing portion.

7. The apparatus of claim and further including:

a top member connecting the left and right legs and connecting the left and right legs to the table top, the top member being spaced from the housing portion; and wherein the top wall of the way cover is disposed between the top member and the housing portion and the left side wall of the way cover being disposed between the left leg and the housing portion and the right side wall of the way cover being disposed between the right leg and the housing portion.

8. The apparatus of claim 4 and further including:

left and right flexible lip seals attached to the left and right shield walls, respectively, and biased outwardly to engage the left and right side walls of the way cover.

9. The apparatus of claim 8 wherein the rail engaging coupling engages the lip seals as it moves along the rail, separating the lip seals from the side walls of the way cover with the lip seals reengaging the side walls of the way covers in areas that the coupling has moved from.

10. A machine tool comprising:

a table with a table top movable along a rail;

a rail cover having a top wall and left and right opposing side walls extending generally downwardly, the rail cover extending over substantially the entire length of the rail and below the table top; and a rail engaging coupling comprising:

bearing means movably engaging the rail; and left and right legs extending outwardly on opposite sides from the bearing means and attached to the table top of the table at distal ends, the left leg extending from the bearing means under the left side wall of the way cover and the right leg extending from the bearing means under the right side wall of the way cover to movably connect the table top with the rail.

11. The machine tool of claim 10 wherein the legs are configured to form a W-shaped yoke member with the bearing means.

12. The tool of claim 10 and further including left and right shield walls positioned proximate the rail and extending substantially alongside the length of the rail, and extending sufficiently upward to provide a barrier to particulate matter.

13. The tool of claim 11 and further including:

left and right shield walls extending alongside opposing sides of the rail along substantially the length of the rail and extending upwardly above the rail;

wherein the left and right legs of the W-shaped yoke extend initially generally upwardly from the bearing means and then outwardly under the side walls of the rail cover and generally upwardly to the table top; and wherein the shield walls are disposed on inward sides of the initial downward extension of the left and right legs and wherein the left and right rail cover side walls are each disposed between respective left and right downward and upward leg extensions to form an interlocking particulate barrier with the shield walls.

14. The tool of claim 11 and further including left and right upwardly extending shield walls disposed on outer sides of the left and right legs, respectively, of the housing portion.

15. The tool of claim 10 and further including:

a top member connecting left and right legs and connecting the left and right legs to the table top, and the top member being spaced from the bearing means; and wherein the top wall of the rail cover is disposed between the top member and the bearing means and the left side wall of the rail cover being disposed between the left leg and the bearing means and the right side wall of the rail cover being disposed between the right leg and the bearing means.

16. The apparatus of claim 14 and further including:

left and right flexible lip seals attached to the left and right shield walls, respectively, and biased outwardly to engage left and right side walls of the rail cover.

17. The apparatus of claim 16 wherein the rail engaging coupling engages the lip seals as it moves along the rail, separating the lip seals from the side walls of the rail cover with the lip seals reengaging the side walls of the way covers in areas that the coupling has moved from.

* * * * *